US012754542B2

(12) United States Patent
Hirata et al.

(10) Patent No.: US 12,754,542 B2
(45) **Date of Patent: *Oct. 6, 2026**

(54) ABNORMALITY DETERMINATION APPARATUS, ABNORMALITY DETERMINATION MODEL GENERATION METHOD, AND ABNORMALITY DETERMINATION METHOD

(71) Applicant: JFE STEEL CORPORATION, Tokyo (JP)

(72) Inventors: Takehide Hirata, Tokyo (JP); Kei Shomura, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 617 days.

This patent is subject to a terminal disclaimer.

(21) Appl. No.: 18/039,638

(22) PCT Filed: Oct. 4, 2021

(86) PCT No.: PCT/JP2021/036628

§ 371 (c)(1),
(2) Date: May 31, 2023

(87) PCT Pub. No.: WO2022/123877

PCT Pub. Date: Jun. 16, 2022

(65) Prior Publication Data

US 2024/0004378 A1 Jan. 4, 2024

(30) Foreign Application Priority Data

Dec. 8, 2020 (JP) ................................ 2020-203428

(51) Int. Cl.
*G05B 23/02* (2006.01)

(52) U.S. Cl.
CPC ....... *G05B 23/024* (2013.01); *G05B 23/0221* (2013.01)

(58) Field of Classification Search
CPC .......................... G05B 23/0221; G05B 23/024
See application file for complete search history.

(56) References Cited

U.S. PATENT DOCUMENTS 8,630,962 B2 1/2014 Maeda et al.
2011/0191076 A1 8/2011 Maeda et al.
(Continued)

FOREIGN PATENT DOCUMENTS

CN 102216534 A 10/2011
CN 107209508 A 9/2017
(Continued)

OTHER PUBLICATIONS

Machine translation of JP2012128840A, downloaded 2025 (Year: 2025).*
(Continued)

*Primary Examiner* — John C Kuan
(74) *Attorney, Agent, or Firm* — Oliff PLC

(57) ABSTRACT

An abnormality determination apparatus: performs, during normal operation of the facility, K times of clipping from time-series signals indicating an operation state of the facility; sets M types as types of the time-series signals clipped by the time-series signal clipping unit, constructs an M-dimensional vector, and registers the constructed vector as a normal vector; sets an abnormality determination flag as a first type when a maximum value of correlation between variables is less than a predetermined value, sets an abnormality determination flag as a second type when the maximum value is the predetermined value or more, and performs, when the flag is of the second type, a principal component analysis on a registered normal vector group to calculate a transform coefficient of a principal component
(Continued)

and registers each of the calculated transform coefficients as an abnormality determination model; and determines an abnormality of the facility.

8 Claims, 9 Drawing Sheets

(56) References Cited

U.S. PATENT DOCUMENTS

| | | | |
|---|---|---|---|
| 2011/0227744 A1 | 9/2011 | Shibata et al. | |
| 2017/0316329 A1 | 11/2017 | Toyama | |
| 2020/0364607 A1 | 11/2020 | BahenaTapia et al. | |
| 2020/0393812 A1* | 12/2020 | Ishikawa | G06F 17/18 |

FOREIGN PATENT DOCUMENTS

| | | | |
|---|---|---|---|
| JP | S63-172004 A | | 7/1988 |
| JP | 2615291 B2 | | 5/1997 |
| JP | 2010092355 A | | 4/2010 |
| JP | 2012-128840 A | | 7/2012 |
| JP | 2013214292 A | * | 10/2013 |
| JP | 5991042 B2 | | 9/2016 |
| JP | 2020-184239 A | | 11/2020 |
| WO | 2019/155533 A1 | | 8/2019 |

OTHER PUBLICATIONS

Tian et al., "Anomaly Detection Using Self-Organizing Maps-Based K-Nearest Neighbor Algorithm" European Conference of the Prognostics and Health Management Society 2014 (Year: 2014).*

Feb. 21, 2025 Office Action issued in Korean Patent Application No. 10-2023-7018218.

Jul. 23, 2025 Office Action issued in Chinese Patent Application No. 202180080734.3.

Zeng, Wei-ru et al.; "Time Series Anomaly Detection Model Based on Hierarchical Temporal Memory"; Acta Electronica Sinica; vol. 46; No. 2; Feb. 2018; pp. 325-332.

May 6, 2024 Extended European Search Report issued in European Patent Application No. 21902981.6.

Dec. 28, 2021 Search Report issued in International Patent Application No. PCT/JP2021/036628.

Oct. 14, 2025 U.S. Office Action issued in U.S. Appl. No. 18/265,353.

May 19, 2026 Office Action Issued in U.S. Appl. No. 18/265,353.

* cited by examiner

ABNORMALITY DETERMINATION APPARATUS, ABNORMALITY DETERMINATION MODEL GENERATION METHOD, AND ABNORMALITY DETERMINATION METHOD

FIELD

The present invention relates to an abnormality determination apparatus, an abnormality determination model generation method, and an abnormality determination method.

BACKGROUND

In a rolling step of the steel process, a steel sheet is rolled by a pair of work rolls and backup rolls. In order to achieve a predetermined thickness of the steel plate at the time of rolling, the hydraulic screw-down device moves a spool of a servo valve by the excitation current to adjust the valve opening degree of the servo valve and adjusts the oil level of an oil column cylinder, thereby controlling the position of the oil column cylinder and controlling the reduction amount of the work roll.

In such a hydraulic screw-down device, it is desirable to detect a small abnormality (minute abnormality) that would worsen spool operations before occurrence of an abnormality that causes an error in spool movement that leads to a work roll reduction failure. In view of such a background, a technique of monitoring abnormality of a hydraulic screw-down device has been proposed.

For example, Patent Literature 1 describes a method of obtaining, at normal operation of a facility, a correlation between a reference value and an actual value regarding a spool movement amount in a servo valve, and detecting an abnormality from a relationship between the reference value and the actual value. Patent Literature 2 describes a method of monitoring the relationship between the excitation current of the servo valve and the position of the oil column cylinder by classifying the relationship into a region where the relationship is proportional and a region where the relationship is saturated.

CITATION LIST

Patent Literature

Patent Literature 1: JP 2615291 B
Patent Literature 2: JP 63-172004 A

SUMMARY

Technical Problem

However, the technique described in Patent Literature 1 perform abnormality monitoring only by the reference value and the actual value of the spool movement amount in the servo valve, and thus, the amount of information for monitoring is not sufficient. In addition, according to the technique described in Patent Literature 2, it is necessary to set an appropriate value to each of the two relationships of the proportional relationship and the saturation state regarding the relationship between the excitation current of the servo valve and the position of the oil column cylinder. However, the relationship between the two types of signals has an allowable variation range even in a normal state, making it difficult to deterministically obtain an appropriate value. Furthermore, when there are a large number of target facilities in cases such as a steel process, it is necessary to set an appropriate value for each of a plurality of relationships between signals of each target facility, resulting in a problem of increase in manpower.

The present invention has been made in view of the above and aims to provide an abnormality determination apparatus, an abnormality determination model generation method, and an abnormality determination method capable of performing universal and high-accuracy detection of an abnormality of a facility having a non-linear characteristic without individually monitoring each facility.

Solution to Problem

To solve the above-described problem and achieve the object, an abnormality determination apparatus according to the present invention for determining an abnormality of a facility performing a predetermined operation includes: a time-series signal clipping unit configured to perform, during normal operation of the facility, K times of clipping from two or more time-series signals indicating an operation state of the facility; a normal vector registration unit configured to set M types as types of two or more time-series signals clipped by the time-series signal clipping unit, construct an M-dimensional vector including M types of variables at a same time, and register the constructed vector as a normal vector; an abnormality determination model registration unit configured to set an abnormality determination flag as a first type when a maximum value of correlation between variables is less than a predetermined value, set an abnormality determination flag as a second type when the maximum value of correlation between the variables is the predetermined value or more, and perform, when the abnormality determination flag is of the second type, a principal component analysis on a registered normal vector group to calculate a transform coefficient of a principal component and register each of the calculated transform coefficients of the principal component as an abnormality determination model; and an abnormality determination unit configured to determine an abnormality of the facility, wherein the abnormality determination unit is configured to construct, at a time of abnormality determination of the facility, one M-dimensional vector from a time-series signal clipped similarly to the time during normal operation, when the abnormality determination flag is of the first type, the abnormality determination unit is configured to calculate a distance from the registered normal vector, extract a predetermined number of the normal vectors as neighboring data in ascending order of the distance, calculate a distance between a centroid vector of the neighboring data and an M-dimensional vector as a target of abnormality determination, and perform abnormality determination on the facility based on the distance, and when the abnormality determination flag is of the second type, the abnormality determination unit is configured to calculate a deviation from the principal component based on the transform coefficient of the principal component calculated in advance, and perform abnormality determination on the facility based on the deviation.

Moreover, the above-described abnormality determination apparatus according to the present invention further includes: a time-series signal collection unit configured to collect a time-series signal indicating an operation state of the facility and a trigger candidate time-series signal that decides a condition for clipping the time-series signal indicating the operation state from a predetermined monitoring target section; and a trigger condition decision model generation unit configured to specify beforehand a start time of the monitoring target section at which clipping regarding the time-series signal indicating an operation state of the facility is performed, generate label data having ON for a label of the start time and OFF for other times, and generate, by machine learning, a trigger condition decision model having each value of one or more of the trigger candidate time-series signals at each time as an input and having the label data at each time as an output, wherein the time-series signal clipping unit is configured to clip the time-series signal based on the trigger condition decision model at the time of normal operation of and abnormality determination on the facility.

Moreover, in the above-described abnormality determination apparatus according to the present invention, the trigger condition decision model is a machine learning model including a decision tree.

Moreover, in the above-described abnormality determination apparatus according to the present invention, the abnormality determination unit is configured to determine necessity of repair of the facility based on a frequency of determinations at which the facility has been determined to be abnormal in a predetermined period.

To solve the above-described problem and achieve the object, an abnormality determination model generation method according to the present invention of generating a model for determining an abnormality of a facility performing a predetermined operation includes: a time-series signal clipping step of performing, during normal operation of the facility, K times of clipping from two or more time-series signals indicating an operation state of the facility; a normal vector registration step of setting types of two or more time-series signals clipped in the time-series signal clipping step as M types, constructing an M-dimensional vector including M types of variables at a same time, and registering the constructed vector as a normal vector; and an abnormality determination model registration step of setting an abnormality determination flag to a first type in a case where a maximum value of correlation between variables is less than a predetermined value, setting the abnormality determination flag to a second type in a case where the maximum value of correlation between variables is the predetermined value or more, and in a case where the abnormality determination flag is of the second type, performing a principal component analysis on a registered normal vector group to calculate a transform coefficient of a principal component and registering each calculated transform coefficient of the principal component as an abnormality determination model.

Moreover, in the abnormality determination model generation method according to the present invention further includes: a time-series signal collection step of collecting a time-series signal indicating an operation state of the facility and a trigger candidate time-series signal that decides a condition for clipping the time-series signal indicating the operation state from a predetermined monitoring target section; and a trigger condition decision model generation step of specifying beforehand a start time of the monitoring target section at which clipping regarding the time-series signal indicating an operation state of the facility is performed, generating label data having ON for a label of the start time and OFF for other times, and generating, by machine learning, a trigger condition decision model having each value of one or more of the trigger candidate time-series signals at each time as an input and having the label data at each time as an output, wherein the time-series signal clipping step clips the time-series signal based on the trigger condition decision model.

To solve the above-described problem and achieve the object, an abnormality determination method according to the present invention of determining an abnormality of a facility for performing a predetermined operation, using an abnormality determination model generated by the abnormality determination model generation method, includes: a time-series signal clipping step of clipping two or more time-series signals indicating an operation state of the facility; and an abnormality determination step of determining an abnormality of the facility; wherein the abnormality determination step includes: determining whether an abnormality determination flag of the time-series signal clipped in the time-series signal clipping step is of a first type or a second type, calculating, when the abnormality determination flag is of the first type, a distance from a registered normal vector, extracting a predetermined number of the normal vectors as neighboring data in ascending order of the distance, calculating a distance between a centroid vector of the neighboring data and an M-dimensional vector as a target of abnormality determination, and performing abnormality determination of the facility based on the distance, and calculating, when the abnormality determination flag is of the second type, a deviation from a principal component based on a transform coefficient of the principal component, which has been calculated in advance, and performing abnormality determination of the facility based on the deviation.

Moreover, in the abnormality determination method according to the present invention, the time-series signal clipping step performs the clipping of the time-series signals using a trigger condition decision model generated by the abnormality determination model generation method.

Advantageous Effects of Invention

According to the present invention, it is possible to perform universal and high-accuracy detection of an abnormality of a facility having a non-linear characteristic without individually monitoring each facility.

DESCRIPTION OF EMBODIMENTS

An abnormality determination apparatus, an abnormality determination model generation method, and an abnormality determination method according to an embodiment of the present invention will be described with reference to the drawings.

(Abnormality Determination Device)

An abnormality determination apparatus is a device for determining (diagnosing) an abnormality in monitoring target facility (hereinafter, simply referred to as "facility" in some cases) in a production facility such as a factory and an experimental facility such as a laboratory, for example. Examples of the monitoring target facility include a facility of an iron making process, production facility regarding manufacturing processes of petroleum related products, chemicals, and the like, and experimental facility in a research institution.

Figure 1:
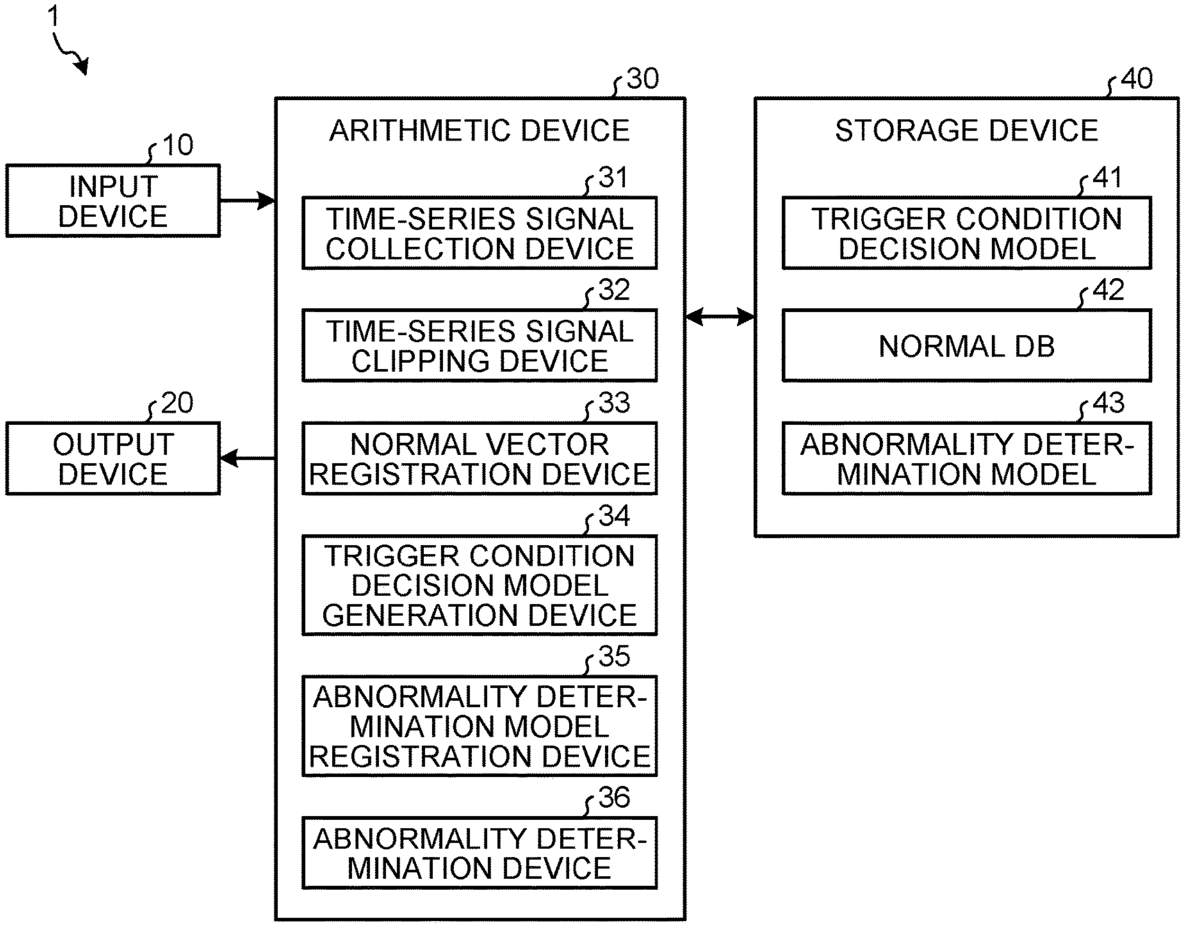
FIG. 1 is a block diagram illustrating a schematic configuration of an abnormality determination model generation device and an abnormality determination apparatus according to an embodiment of the present invention.

An abnormality determination apparatus 1 is implemented by a general-purpose information processing device such as a personal computer or a workstation, for example. As illustrated in FIG. 1, the abnormality determination apparatus 1 includes an input device 10, an output device 20, an arithmetic device 30, and a storage device 40.

The input device 10 is means of inputting data to the arithmetic device 30, and is implemented by a device such as a data collection device, a keyboard, and a pointing device. The output device 20 is means of outputting data processed by the arithmetic device 30, and is implemented by a device including a display device such as a liquid crystal display.

The arithmetic device 30 is implemented by: a processor including a central processing unit (CPU); and memory (main storage device) including random access memory (RAM) and read only memory (ROM). The arithmetic device 30 loads a program into a work area of the main storage device and executes a program, and controls each component and the like through the execution of the program, thereby implementing a function corresponding to a predetermined purpose.

Figure 2:
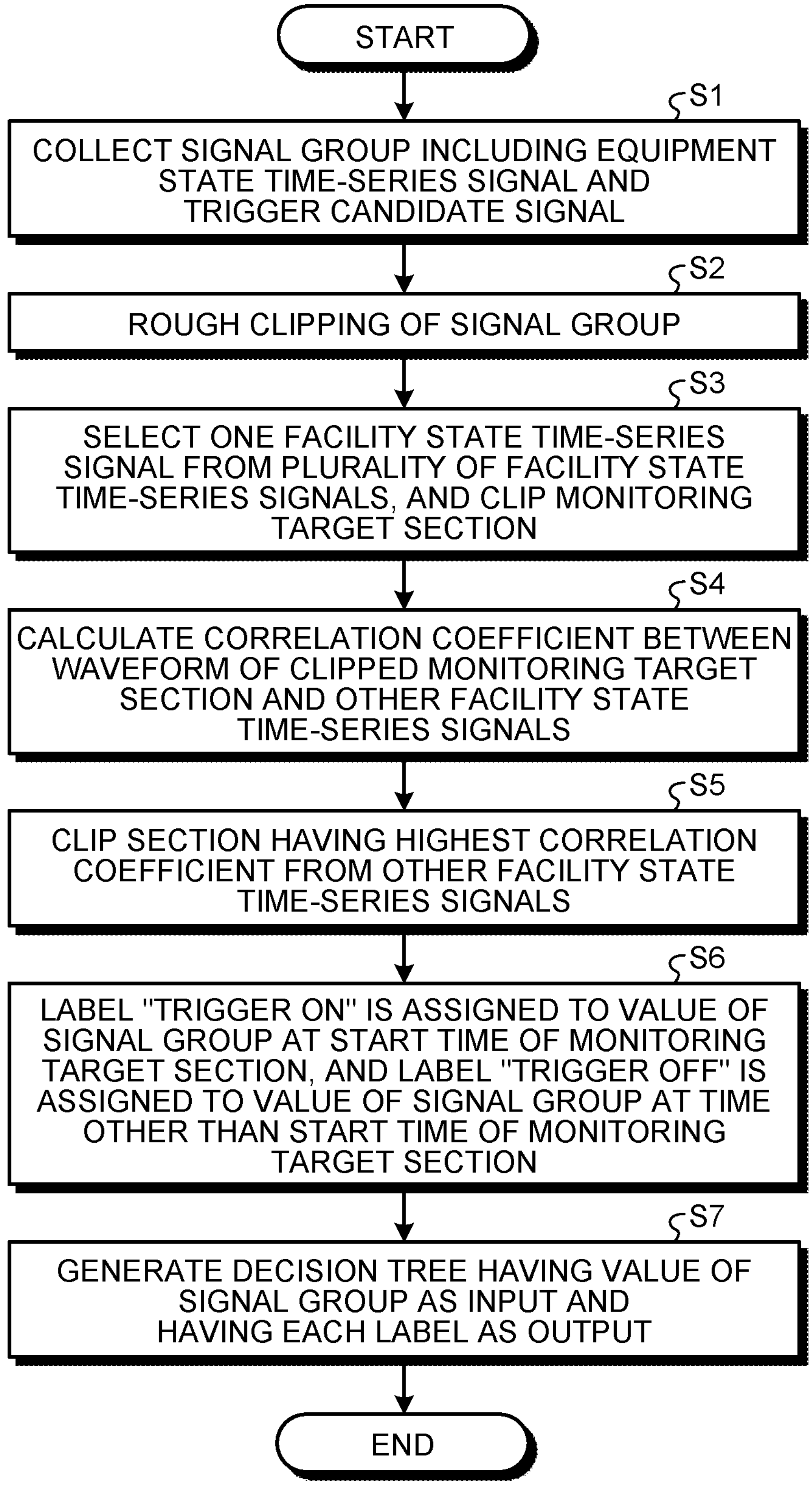
FIG. 2 is a flowchart illustrating a flow of a trigger condition decision model generation method according to the embodiment of the present invention.

In addition, through the execution of the program described above, the arithmetic device 30 functions as a time-series signal collection device (time-series signal collection unit) 31, a time-series signal clipping device (time-series signal clipping unit) 32, and a normal vector registration device (normal vector registration unit) 33. The arithmetic device 30 also functions as a trigger condition decision model generation device (trigger condition decision model generation unit) 34, an abnormality determination model registration device (abnormality determination model registration unit) 35, and an abnormality determination device (abnormality determination unit) 36. Details of each device will be described below (refer to FIGS. 2 and 9). Although FIG. 1 illustrates an example in which the function of each device is implemented by one arithmetic device 30 (≈ one computer), the function of each device may be implemented by a plurality of arithmetic devices.

The storage device 40 is means of storing a result of arithmetic operation by the arithmetic device 30, and is implemented by a device such as a hard disk device. The storage device 40 stores a trigger condition decision model 41, a normal DB 42, and an abnormality determination model 43. In addition to the above model, the storage device 40 also stores, as necessary, data processed by the arithmetic device 30 (examples of data includes a monitoring target signal, a trigger candidate signal, and a trigger condition).

The trigger condition decision model 41 is a learning model used at decision of the trigger condition. As will be described below, the trigger condition decision model 41 is generated beforehand by the trigger condition decision model generation device 34 and stored in the storage device 40.

Here, the "trigger condition" indicates a condition for clipping a time-series signal when registering a normal vector (normal data) in the normal DB 42, when registering the abnormality determination model 43, and when performing abnormality determination in an abnormality determination method to be described below.

Specifically, the trigger condition indicates a condition for designating a timing for clipping a section to be an abnormality determination target (hereinafter, referred to as "monitoring target section") from a time-series signal indicating an operation state of a facility (hereinafter, also referred to as a "facility state time-series signal"). This trigger condition indicates a clipping start time and a clipping range of the time-series signal, for example. A time-series signal that decides a condition (trigger condition) for clipping the facility operation time-series signal from the monitoring target section is referred to as a "trigger candidate signal".

The facility operation time-series signal varies depending on the type of monitoring target facility. For example, when the monitoring target facility is a "motor", the current, speed, or the like of the motor is used as the facility operation time-series signal. The abnormality determination apparatus 1 constantly collects one or more facility state time-series signals and trigger candidate signals corresponding these signals. The trigger candidate signal is a time-series signal related to the monitoring target facility and indicates a time-series signal detected at the same time as the facility operation time-series signal.

Typically, the monitoring target facility starts operation when a single or a plurality of conditions is satisfied. The trigger candidate signal, indicating this condition, is issued as a signal such as an On or Off signal. With prior knowledge of the trigger condition, it is easy to clip the monitoring target section. However, in the presence of a large number of various types of a facility with complicated operation, it would be difficult to easily perform judgment of this trigger condition. There is another case where the trigger candidate signal directly indicating the trigger condition has not been captured in the database, and only indirect signals are present.

To deal with this, a signal group defining a facility operation condition is selected as a trigger candidate signal, an operation start rule is extracted from a history of these signals by machine learning or the like, so as to decide a condition for clipping a monitoring target section. The trigger candidate signal is desirably a signal not directly related to an abnormality of a target process, facility, or the like, and examples of the candidate for this signal include various command values, and a signal indicating ON/OFF of a specific event. However, the trigger candidate signal may include the monitoring target signal itself.

In addition, the monitoring target section indicates a section to be clipped for performing abnormality determination out of the facility operation time-series signal. When the monitoring target section is clipped from the facility operation time-series signal, the time to start the clipping of the time-series signal (hereinafter, referred to as "clipping start time") and the clipping range are designated. In this occasion, the clipping start time is designated by a value of the trigger candidate signal collected simultaneously with the facility operation time-series signal. The clipping range varies depending on the type of the monitoring target facility. For example, when the monitoring target facility is a "motor", it is allowable to designate a section in which the motor accelerates, as the clipping range. Alternatively, in the case of a product manufacturing process, it is also possible to designate a range of the section from the start of manufacturing to the end of manufacturing.

The normal DB 42 is a database used when the abnormality determination apparatus 1 performs abnormality determination. The normal DB 42 stores data (hereinafter, referred to as a "normal vector") representing normal operation states of the facility during past operation. The normal vector is formed with an M-dimensional vector including M types of variables corresponding to the types of time-series signals clipped by the time-series signal clipping device 32.

The abnormality determination model 43 is a learning model used at execution of abnormality determination in an abnormality determination method to be described below. As will be described below, the abnormality determination model 43 is generated beforehand by the abnormality determination model registration device and stored in the storage device 40. Details of the abnormality determination model 43 will be described below.

(Trigger Condition Decision Model Generation Method)

A method of generating the trigger condition decision model 41 according to the embodiment will be described with reference to FIGS. 2 to 8. The trigger condition decision model generation method includes execution of a time-series signal collection step (step S1), time-series signal clipping steps (steps S2 to S5), and a trigger condition decision model generation steps (steps S6 and S7), which are performed in this order. In addition, as will be described below, the trigger condition decision model generation method repeats the time-series signal clipping step and the trigger condition decision model generation step as necessary.

<Time-Series Signal Collection Step>

In the time-series signal collection step, the time-series signal collection device 31 collects a signal group including a facility state time-series signal and a trigger candidate signal (step S1). Although the following will describe a case where the time-series signal collection device 31 collects a plurality of time-series signals, the time-series signal collection device 31 may collect one time-series signal.

<Time-Series Signal Clipping Step>

In the time-series signal clipping step, the time-series signal clipping device 32 clips, from the signal group collected in the time-series signal collection step, a monitoring target section of the facility operation time-series signal based on a predetermined standard. Hereinafter, details of the time-series signal clipping step will be described.

Figure 3:
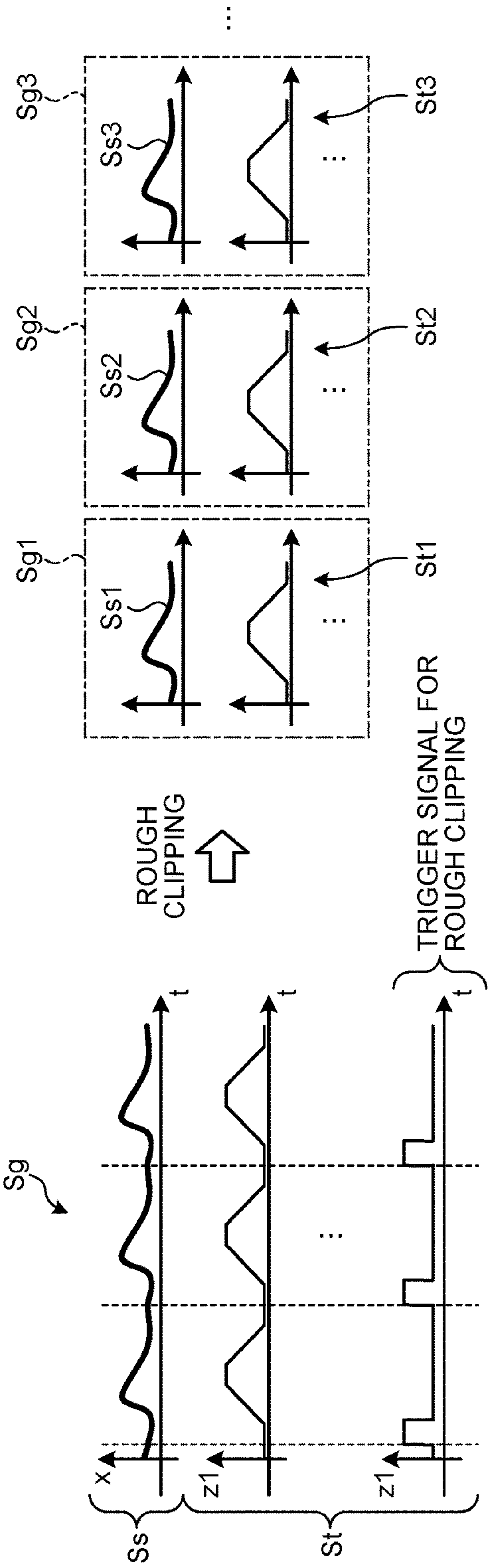
FIG. 3 is a diagram schematically illustrating details of a time-series signal clipping step in the trigger condition decision model generation method according to the embodiment of the present invention.

First, as illustrated in FIG. 3, the time-series signal clipping device 32 roughly clips a signal group (step S2). For example, a facility that performs repeated operations, such as a coil rolling facility, has continuously and seamlessly acquired a facility state time-series signal and a trigger candidate signal for a continuously flowing coil. Accordingly, in step S2, a signal group is roughly clipped in order to divide the facility state time-series signal and the trigger candidate signal for each coil, for example. The rough clipping of the signal group may be performed at a preset timing according to the type of the monitoring target facility, or a rough clipping signal may be selected from a plurality of trigger candidate signals and then rough clipping may be performed at a rising timing of the rough clipping signal as illustrated in the drawing.

In FIG. 3, a reference sign Sg denotes a signal group before rough clipping, a reference sign Ss denotes a facility state time-series signal before rough clipping, a reference sign St denotes a trigger candidate signal before rough clipping, and reference signs Sg1, Sg2, and Sg3 denote signal groups after rough clipping. In the drawing, reference signs Ss1, Ss2, and Ss3 denote facility state time-series signals after rough clipping, and reference signs St1, St2, and St3 denote trigger candidate signals after rough clipping.

Figure 4:
FIG. 4 is a diagram schematically illustrating details of a time-series signal clipping step in the trigger condition decision model generation method according to the embodiment of the present invention.

Next, as illustrated in FIG. 4(*a*), the time-series signal clipping device 32 selects one facility state time-series signal (a facility state time-series signal Ss1 in the drawing) from among the plurality of facility state time-series signals roughly clipped in step S2. Subsequently, a monitoring target section Sm1 of the selected facility state time-series signal Ss1 is clipped (step S3). The clipping condition for clipping the monitoring target section Sm1 in step S3 is decided based on the facility characteristic of the monitoring target facility. For example, when the monitoring target facility is a "motor" and the facility state time-series signal Ss1 is a "current value of the motor" and it is to be determined whether a degree of increase in the current value of the motor when the motor accelerates is normal, a section in which the motor accelerates is set as the monitoring target section Sm1 as illustrated in the drawing. That is, a time point at which the motor starts acceleration is designated as the clipping start time of the monitoring target section Sm1, and a section from the start of acceleration to the end of acceleration is designated as a clipping range.

Next, the time-series signal clipping device 32 calculates a correlation coefficient between a waveform included in the monitoring target section Sm1 clipped in step S3 and waveforms included in other facility state time-series signals Ss2 and Ss3 (step S4). Next, as illustrated in FIG. 4(*b*), the time-series signal clipping device 32 searches for a section having the largest correlation coefficient in relation with the waveform included in the monitoring target section Sm1 clipped in step S3 in the other facility state time-series signals Ss2 and Ss3. With this operation, the monitoring target sections Sm2 and Sm3 of the facility state time-series signals Ss2 and Ss3 are respectively clipped (step S5).

In this manner, steps S4 and S5 search for a waveform similar to the waveform included in the monitoring target section Sm1 clipped in step S3 from among the waveforms included in the facility state time-series signals at other times roughly clipped in step S2. Similar waveforms may be searched by a method such as a Euclidean distance or the like across data of each time-series signal, in addition to the comparison of the correlation coefficients described above.

<Trigger Condition Decision Model Generation Step>

The trigger condition decision model generation step specifies beforehand the start time of the monitoring target section to be clipped for each signal group (plurality of facility state time-series signals). Subsequently, the step generates label data in which the label for the start time is set to ON and the label for the other times are set to OFF, and then, using machine learning, generates a learning model having each value of one or more trigger candidate signals at each time as input and having the label data at each time as output.

Figure 5:
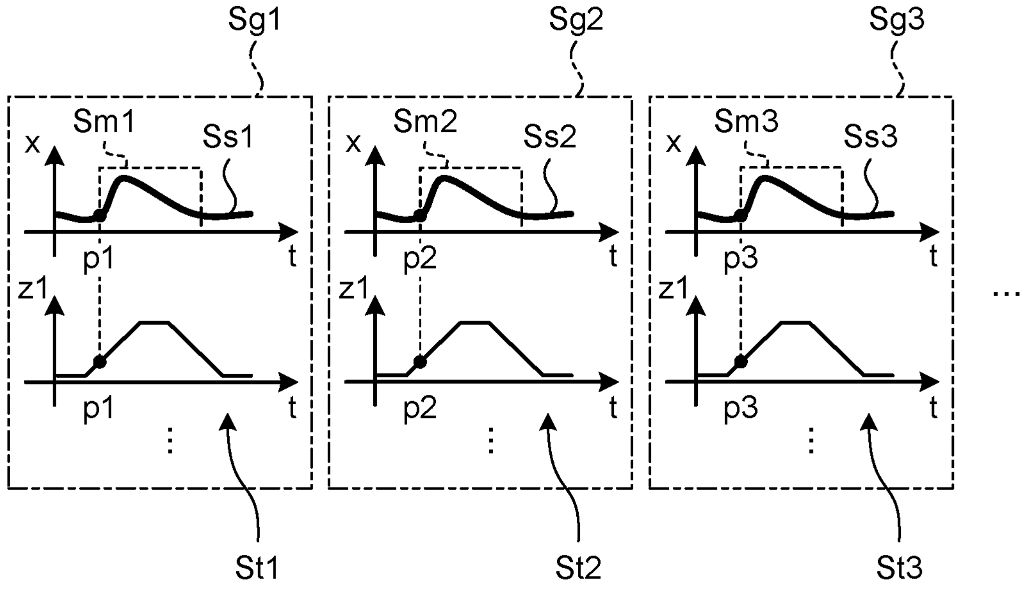
FIG. 5 is a diagram schematically illustrating details of a trigger condition decision model generation step in the trigger condition decision model generation method according to the embodiment of the present invention.

In the trigger condition decision model generation step, first, as illustrated in FIG. 5, the trigger condition decision model generation device 34 performs the following processing for each signal group. That is, a label "trigger ON" is assigned to the values of the facility state time-series signals Ss1, Ss2, and Ss3 and the values of the trigger candidate signals St1, St2, and St3 corresponding to the start times p1, p2, and p3 of the monitoring target sections Sm1, Sm2, and Sm3 that have been clipped. In addition, a label "trigger OFF" is assigned to the values of the facility state time-series signals Ss1, Ss2, and Ss3 and the values of the trigger candidate signals St1, St2, and St3 corresponding to the time other than the start time of the clipped monitoring target sections Sm1, Sm2, and Sm3 (step S6). Note that the values of the facility state time-series signals Ss1, Ss2, and Ss3 and the values of the trigger candidate signals St1, St2, and St3 are hereinafter referred to as "signal group values". In addition, the label "trigger ON" indicates that the value of the signal group to which this label is assigned is the clipping start time, while the label "trigger OFF" indicates that the value of the signal group to which this label is assigned is not the clipping start time.

Figure 6:
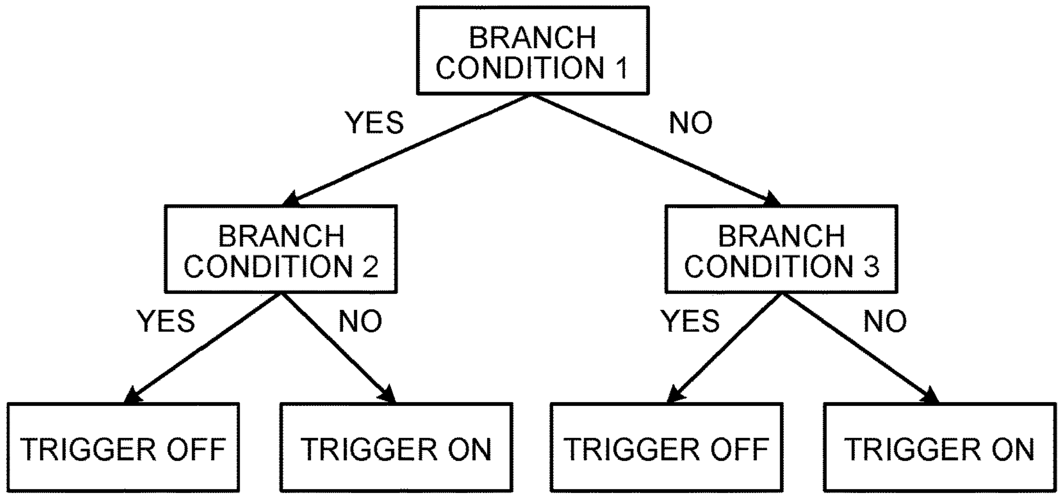
FIG. 6 is a diagram schematically illustrating a decision tree generated in a trigger condition decision model generation step in the trigger condition decision model generation method according to the embodiment of the present invention.

Next, the trigger condition decision model generation device 34 performs machine learning using the value of the signal group labeled as "trigger ON" and the value of the signal group labeled as "trigger OFF" as inputs and having the label of "trigger ON" and the label of "trigger OFF" as outputs. With this operation, a decision tree is generated as illustrated in FIG. 6 (step S7).

Specifically, the decision tree can be generated using training data in which the objective variable is set to the labels of "trigger ON" and "trigger OFF", and the value of each trigger candidate signal corresponding to each time of "trigger ON" and "trigger OFF" is set to the explanatory variable. Here, the operation may be treated as a function with "trigger ON" as "1" and the "trigger OFF" as "0". It is also possible to use, various machine learning models other than the decision tree. Therefore, the learning model generated in step S7 is not limited to the decision tree, and may be a model such as a random forest and a neural network, for example. Here, the operation may be treated as a function with "trigger ON" as "1" and the "trigger OFF" as "0".

Figure 7:
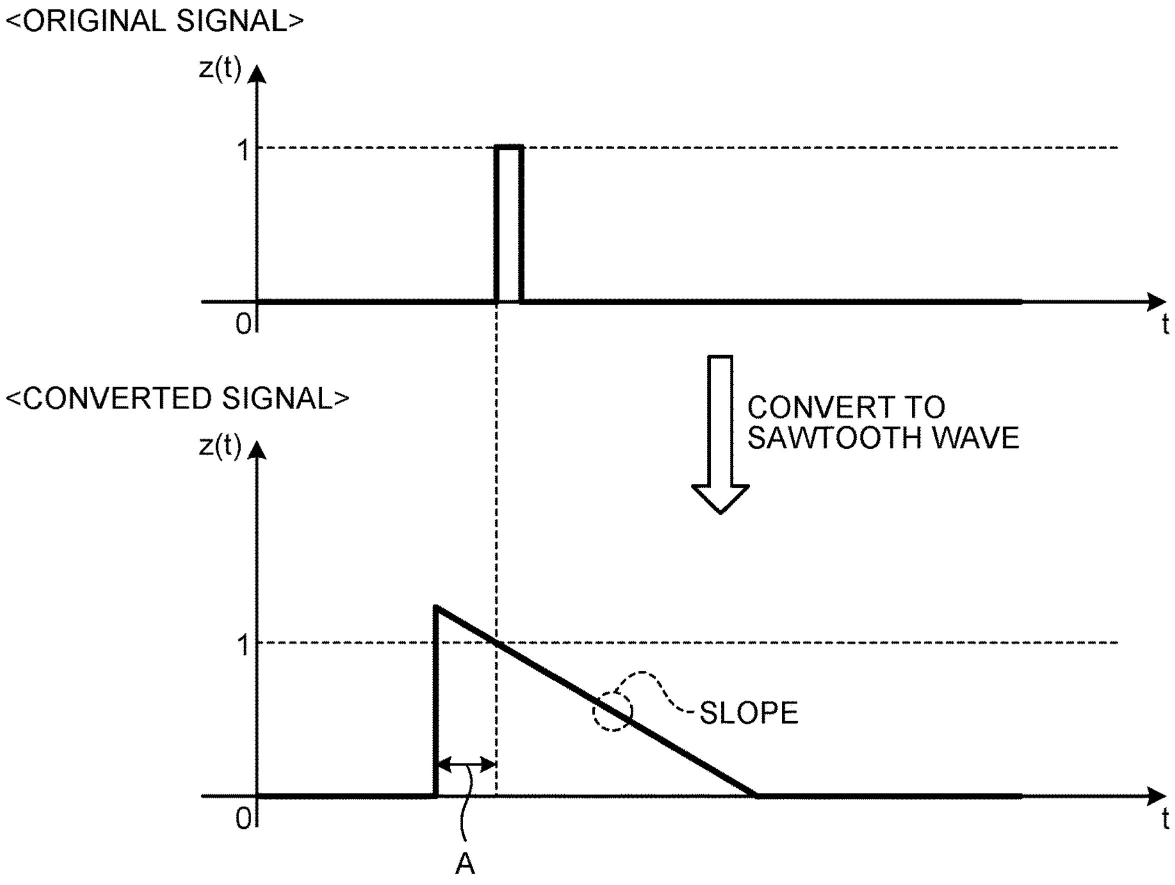
FIG. 7 is a diagram schematically illustrating a state in which one pulse signal is converted into a sawtooth wave in the trigger condition decision model generation step in the trigger condition decision method for a time-series signal according to the embodiment of the present invention.

Here, in a case where the trigger candidate signal included in the signal group is one pulse signal in the trigger condition decision model generation step, machine learning is performed after the trigger candidate signal is converted into a sawtooth wave as illustrated in the lower diagram of FIG. 7. Note that, as illustrated in the upper diagram of the drawing, the "one pulse signal" indicates a signal that is turned on only for one scan of the rising or falling edge of the signal among the ON-OFF signals.

As illustrated in the upper diagram of FIG. 7, one pulse signal is a signal that is turned on only for a short time. Therefore, when searching for a portion having a high waveform similarity in the time-series signal clipping step, there is a case where the time of "trigger ON" is shifted forward or backward from the time at which the one pulse signal turns ON although one pulse signal should also be turned on at the time of "trigger ON". In contrast, as illustrated in the drawing, by converting one pulse signal into a sawtooth wave, it is possible to solve a problem caused by the ON/OFF delay of one pulse signal.

The slope of the sawtooth wave after conversion is decided by, for example, a length in seconds desirably to be checked after one pulse signal is turned on, and is set to a slope not overlapping the rise of the next signal. In addition, when one pulse signal is converted into a sawtooth wave, it is desirable to provide a margin (for example, about 5 scans) in consideration of a case where the clipping of the monitoring target section is started before the one pulse signal is turned on due to the shift of the clipping start point as illustrated in A of FIG. 7.

Figure 8:
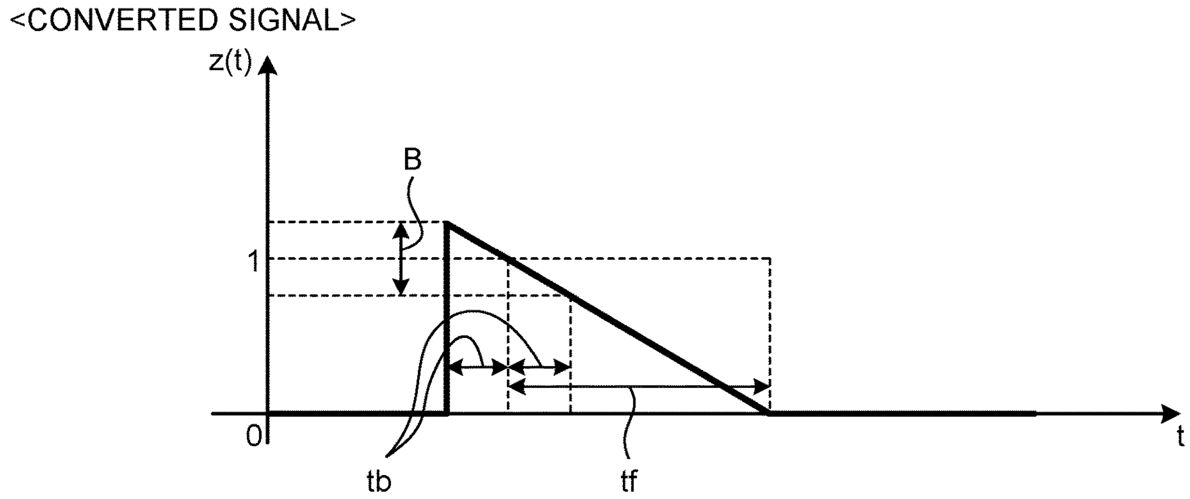
FIG. 8 is a diagram schematically illustrating a sawtooth wave converted in the trigger condition decision model generation step in the trigger condition decision method for a time-series signal according to the embodiment of the present invention.

The shape of the sawtooth wave is defined by parameters tf and tb as illustrated in FIG. 8, and the relationship between the parameters tf and tb is desirably set to $tb<tf$. In the case of a sawtooth wave, as illustrated in the drawing, when a value z of the converted signal is within a range indicated by B, the judgment is trigger ON.

When the trigger condition decision model generation step has an occurrence of an error in normally generation the trigger condition during machine learning or has not obtained determination accuracy with a predetermined value, etc., the process returns to the above-described time-series signal clipping step, and the monitoring target section clipped last time is shifted forward or backward. After the monitoring target section is newly clipped out of the facility state time-series signal, the trigger condition decision model generation step is performed again. That is, after re-clipping the monitoring target section of the facility state time-series signal, the decision tree is constructed again. When the trigger condition can be normally generated at the time of machine learning, the trigger condition decision model generation step is ended. When the trigger condition cannot be normally generated, the process returns to the time-series signal clipping step again, and reattempts the time-series signal clipping step and the trigger condition decision model generation step.

As illustrated in FIG. 4, the trigger condition decision model generation method according to the present embodiment is a method of learning the state of the trigger candidate signal at the start time of the monitoring target section (monitoring target section Sm1) initially designated in the time-series signal clipping step. Therefore, in a case where there is no characteristic in the state of the trigger candidate signal at the start time of the monitoring target section designated first, for example, learning cannot be performed well. To handle this, when an error occurs in the trigger condition decision model generation step, as described above, the monitoring target section initially designated in the time-series signal clipping step is shifted forward or backward, and the monitoring target section is designated again, making it possible to solve the problem at the time of learning.

(Abnormality Determination Model Generation Method)

Figure 9:
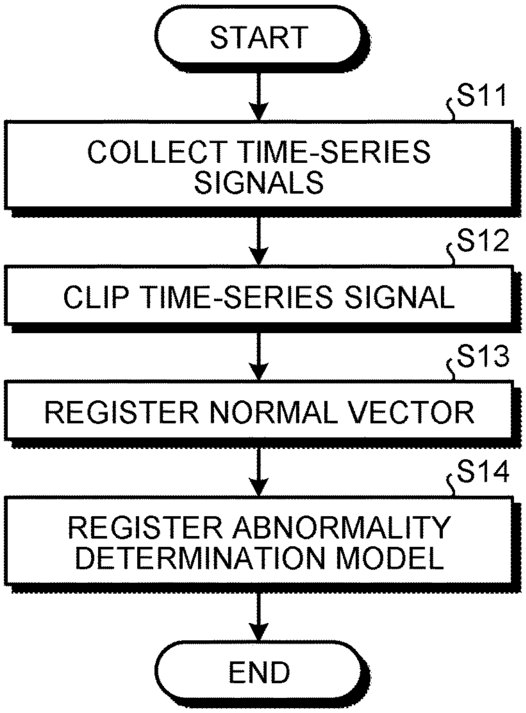
FIG. 9 is a flowchart illustrating a flow of an abnormality determination model generation method according to the embodiment of the present invention.

An abnormality determination model generation method according to the embodiment will be described with reference to FIG. 9. The abnormality determination model generation method includes execution of a time-series signal collection step (step S11), a time-series signal clipping step (step S12), a normal vector registration step (step S13), and an abnormality determination model registration step (step S14), which are performed in this order.

<Time-Series Signal Collection Step>

In the time-series signal collection step, the time-series signal collection device 31 collects a signal group including a facility state time-series signal and a trigger candidate signal (step S11). Although the following will describe a case where the time-series signal collection device 31 collects a plurality of facility state time-series signal, the time-series signal collection device 31 may collect one facility state time-series signal.

<Time-Series Signal Clipping Step>

In the time-series signal clipping step, the time-series signal clipping device 32 clips, from the signal group collected in the time-series signal collection step, a monitoring target section of the facility state time-series signal during normal operation (step S12). In the time-series signal clipping step, the time-series signal clipping device 32 performs, during normal operation of the facility, K times of clipping of the monitoring target section from the two or more facility state time-series signals based on the trigger condition decision model 41. That is, the time-series signal clipping device 32 inputs the facility state time-series signal and the trigger candidate signal during the normal operation to the decision tree, thereby deciding the trigger condition from the branch condition of the decision tree, and clipping the monitoring target section based on the trigger condition decided.

<Normal Vector Registration Step>

In the normal vector registration step, the normal vector registration device 33 sets the types of two or more time-series signals clipped in the time-series signal clipping step as M types, and constructs an M-dimensional vector including M types of variables for the same time. Subsequently, the constructed vector is registered in the normal DB 42 of the storage device 40 as a normal vector (step S13).

<Abnormality Determination Model Registration Step>

In the abnormality determination model registration step, the abnormality determination model 43 is registered (step S14). In the abnormality determination model registration step, specifically, when the maximum value of the correlation between the variables is less than a predetermined value for the normal vector registered in the normal DB 42, the abnormality determination flag is set to a first type. When the maximum value of the correlation between the variables is the predetermined value or more, the abnormality determination flag is set to a second type. When the abnormality determination flag is the second type, a principal component analysis is performed on a normal vector group registered in the normal DB 42 to calculate a transform coefficient of the principal component, and then, each of the calculated transform coefficients of the principal component is registered in the storage device 40 as the abnormality determination model 43. Accordingly, each of the plurality of abnormality determination models is classified into the first type or the second type, and the classification is recorded in the abnormality determination flag of each abnormality determination model. Here, examples of the abnormality determination model created by performing the principal component analysis include a Q statistic and a T2 statistic.

(Abnormality Determination Method)

Figure 10:
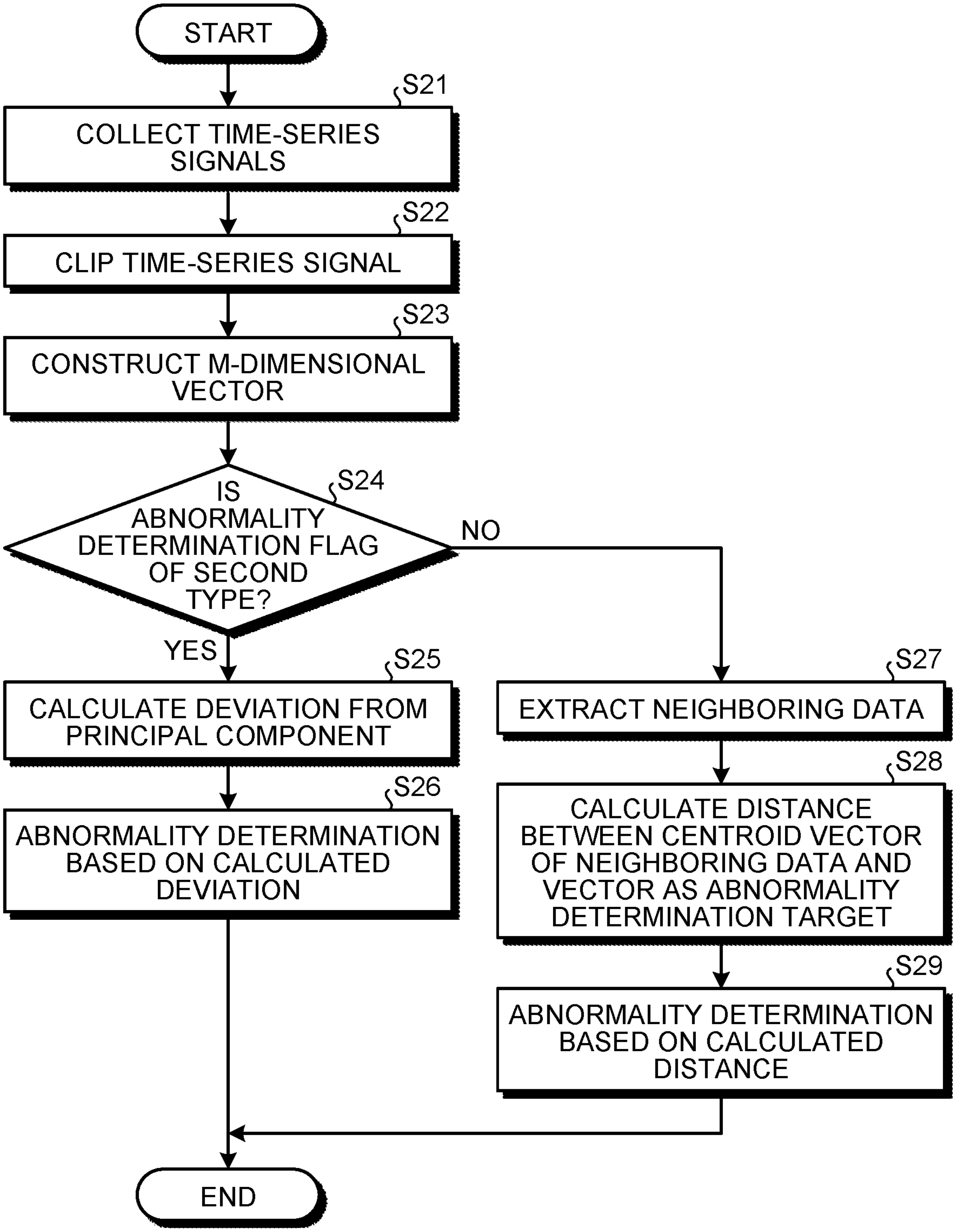
FIG. 10 is a flowchart illustrating a flow of an abnormality determination method according to the embodiment of the present invention.

An abnormality determination method according to the embodiment will be described with reference to FIG. 10. The abnormality determination method includes execution of a time-series signal collection step (step S21) and an abnormality determination step (steps S22 to S29), which are performed in this order.

<Time-Series Signal Collection Step>

In the time-series signal collection step, the time-series signal collection device 31 collects a signal group including the facility state time-series signal and the trigger candidate signal (step S21). Although the following will describe a case where the time-series signal collection device 31 collects a plurality of facility state time-series signal, the time-series signal collection device 31 may collect one facility state time-series signal.

<Abnormality Determination Step>

The abnormality determination step determines an abnormality of the facility is determined based on the facility state time-series signal for abnormality determination by using either the normal vector or the abnormality determination model 43.

In the abnormality determination step, the time-series signal clipping device 32 clips, from the signal group collected in the time-series signal collection step, a monitoring target section of the facility state time-series signal for abnormality determination (step S22). In this occasion, the time-series signal clipping device 32 clips the monitoring target section from the two or more facility state time-series signals based on the trigger condition decision model 41. That is, the time-series signal clipping device 32 inputs the facility state time-series signal and the trigger candidate signal to the decision tree, thereby deciding the trigger condition from the branch condition of the decision tree and clipping the monitoring target section based on the trigger condition decided.

More specifically, the time-series signal clipping device 32 inputs the value of the trigger candidate signal for each of the times to the trigger condition decision model 41. From one or more facility state time-series signals, L pieces of data are clipped during a predetermined period from a time point when the output of the trigger condition decision model 41 is turned on, thereby clipping the facility state time-series signal for abnormality determination.

Subsequently, the abnormality determination device 36 constructs one M-dimensional vector including M types of signals for the same time regarding the facility state time-series signal for abnormality determination clipped by the time-series signal clipping device 32 (step S23).

Subsequently, regarding the M-dimensional vector constructed in step S23, the abnormality determination device 36 determines whether the abnormality determination flag is of the second type (step S24). When it is determined that the abnormality determination flag is of the second type (Yes in step S24), the abnormality determination device 36 calculates a deviation from the principal component based on the transform coefficient of the principal component of the normal vector group calculated in advance (step S25). Subsequently, based on the deviation calculated in step S25, the abnormality determination device 36 performs abnormality determination on the facility (step S26) to complete the present processing.

When it is determined in step S24 that the abnormality determination flag is not of the second type (No in step S24), the abnormality determination device 36 judges that the abnormality determination flag is of the first type. Subsequently, a distance between the abnormality determination target vector (M-dimensional vector) and the normal vector registered in the normal DB 42 is calculated, and a predetermined number of normal vectors are extracted as neighboring data in ascending order of the distance (step S27). Here, which of the abnormality determination flags each signal corresponds to may be decided for each signal at the time of abnormality determination model generation registration, and may be determined based on the decision.

Subsequently, the abnormality determination device 36 calculates the distance between the centroid vector of the neighboring data extracted in step S20 and the abnormality determination target vector (step S28). Subsequently, based on the distance calculated in step S28, the abnormality determination device 36 performs abnormality determination on the facility (step S29) to complete the present processing. The reason for this determination is as follows. That is, since the first type needs a large calculation cost, it is desirable to first determine whether the type is the second type and to use the first type only in the case of a non-linear characteristic that affects determination accuracy with the second type.

Here, in the abnormality determination step, the abnormality determination device 36 preferably determines the necessity of repairing the facility based on the number of times of abnormality determinations made for the facility in a predetermined period. The number of times of abnormality determination that requires repair of the facility can be obtained experimentally or empirically.

The principle of the abnormality determination step in the abnormality determination method according to the embodiment will be described with reference to FIG. 11. The abnormality determination device 36 first plots the normal vector (normal data) stored in the normal DB 42 in a space of variables having individual signals constituting the normal vector set as variables (variables 1 to 3 in the drawing). The abnormality determination device 36 plots the abnormality determination target vector (monitoring target data) in an identical space of variables, and determines that the abnormality determination target vector is abnormal when the degree of deviation of the abnormality determination target vector from the distribution of the normal vectors is large in the space of variables.

In the abnormality determination method according to the embodiment, as a reference for the degree of deviation of the abnormality determination target vector from the distribution of the normal vectors, a predetermined number of normal vectors in the neighborhood of the abnormality determination target vector are extracted as neighboring data. Subsequently, a distance d0 between the centroid vector of the predetermined number of pieces of the extracted neighboring data and the abnormality determination target vector is calculated. Regarding the above-described neighboring data, a predetermined number of normal vectors are extracted in ascending order of a distance d (radius of a circle indicated by a dotted line in FIG. 11) to the abnormality determination target vector.

Figure 11:
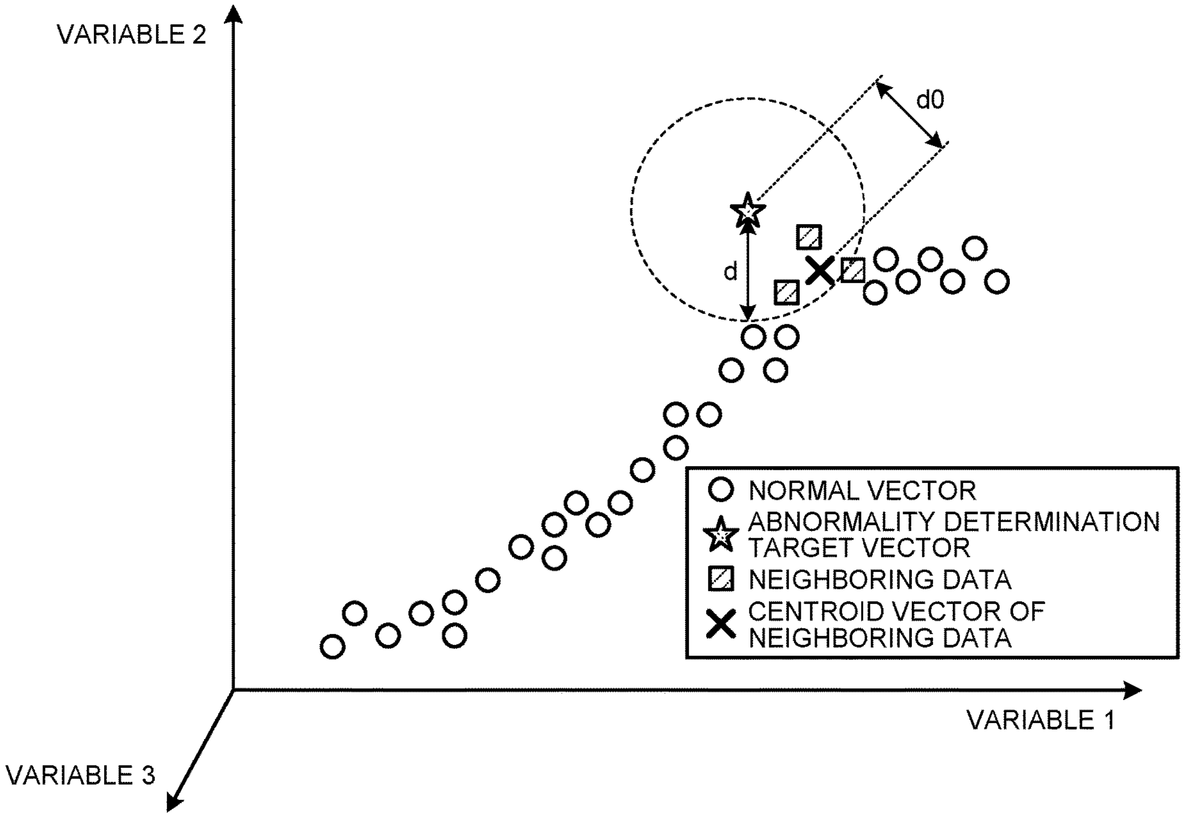
FIG. 11 is a diagram illustrating a principle of the abnormality determination step in the abnormality determination method according to the embodiment of the present invention.

As illustrated in FIG. 11, when the degree of deviation of the abnormality determination target vector from the distribution of the normal vectors is large, the distance d0 between the centroid vector of the neighboring data and the abnormality determination target vector becomes large. In contrast, when the degree of deviation of the abnormality determination target vector from the distribution of the normal vector is small, the distance d0 between the abnormality determination target vector and the centroid vector of the neighboring data becomes very small. Accordingly, when the distance d0 between the abnormality determination target vector and the centroid of the neighboring data is large, the abnormality determination device 36 determines that the abnormality determination target vector is abnormal.

With the abnormality determination apparatus 1 and the abnormality determination method according to the embodiment as described above, it is possible to perform universal and high-accuracy detection of an abnormality of a piece of a facility having a non-linear characteristic without individually monitoring each facility.

That is, with the abnormality determination apparatus 1 and the abnormality determination method, regarding the facility for which the abnormality determination flag is determined to be the first type, a set of data of an identical same timing is extracted from each of pieces of time-series data of a plurality of designated signals obtained from the facility. Subsequently, data is plotted inside a space of variables, having each of the designated signals as variables, and then the degree of deviation of the abnormality determination target vector during operation from the distribution of the normal vector during normal operation is determined using the distance between the abnormality determination target vector and the centroid vector of the neighboring data.

Figure 12:
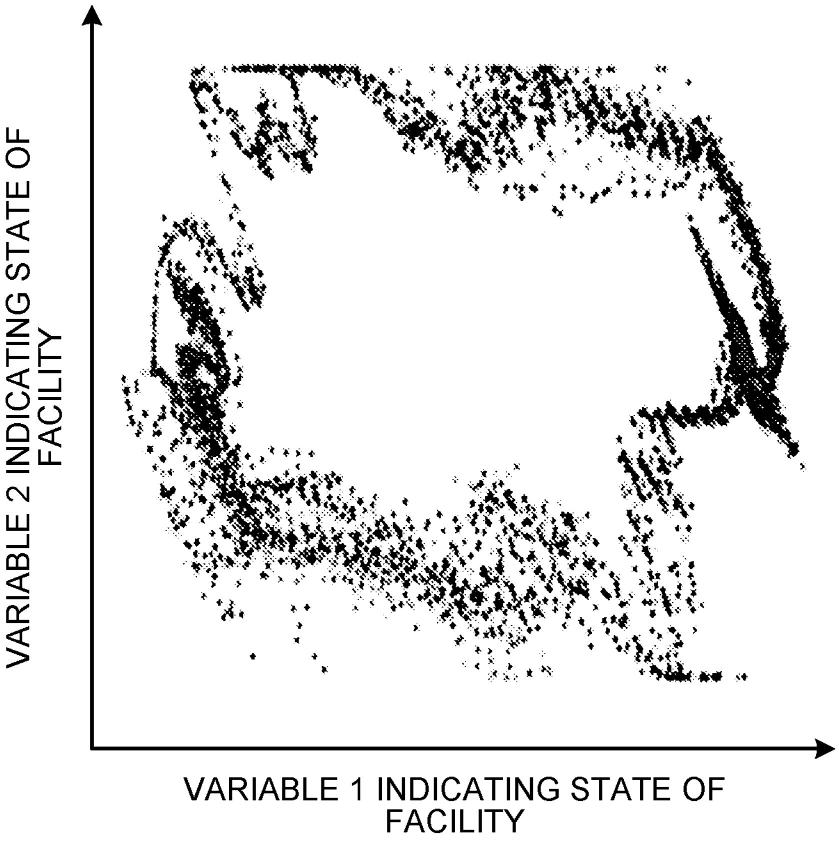
FIG. 12 is a diagram illustrating effects of the abnormality determination method according to the embodiment of the present invention.

With this configuration, even in a case where the state of the facility is indicated by non-linear variables having high correlation as illustrated in FIG. 12, for example, it is possible to perform highly accurate abnormality determination without errors such as false negative or false positive.

In addition, with the abnormality determination apparatus 1 and the abnormality determination method, for the facility determined to have the abnormality determination flag of the second type, the abnormality determination can be performed with high accuracy only with a calculation load of about four arithmetic operations by using a device such as a programmable logic controller (PCL), for example.

The abnormality determination apparatus 1 and the abnormality determination method according to the embodiment have the following effects. By generating and using the trigger condition decision model 41 that has learned the conditions under which the facility state time-series signal and the trigger candidate signal become trigger ON signals, it is possible to perform automatic decision of the trigger condition for clipping the monitoring target section from the facility state time-series signal. In addition, with the abnormality determination apparatus 1 and the abnormality determination method according to the embodiment, it is possible to perform automatic decision of the trigger condition for clipping the start target section from the facility state time-series signal, and thus, there is no need to manually examine and determine the trigger condition. This makes it possible to simplify preliminary preparation required for abnormality determination of a facility.

Hereinabove, the abnormality determination apparatus, the abnormality determination model generation method, and the abnormality determination method according to the present invention have been specifically described by the embodiments and examples for carrying out the invention. However, the scope and spirit of the present invention is not limited to these descriptions, and should be broadly interpreted based on the description of the claims. It goes without saying that various changes, modifications, and the like based on these descriptions are also included in the scope and spirit of the present invention.

REFERENCE SIGNS LIST

1 ABNORMALITY DETERMINATION APPARATUS
10 INPUT DEVICE
20 OUTPUT DEVICE
30 ARITHMETIC DEVICE
31 TIME-SERIES SIGNAL COLLECTION DEVICE
32 TIME-SERIES SIGNAL CLIPPING DEVICE
33 NORMAL VECTOR REGISTRATION DEVICE
34 TRIGGER CONDITION DECISION MODEL GENERATION DEVICE
35 ABNORMALITY DETERMINATION MODEL REGISTRATION DEVICE
36 ABNORMALITY DETERMINATION DEVICE
40 STORAGE DEVICE
41 TRIGGER CONDITION DECISION MODEL
42 NORMAL DB
43 ABNORMALITY DETERMINATION MODEL

The invention claimed is:

1. An abnormality determination apparatus for determining an abnormality of a facility performing a predetermined operation, the abnormality determination apparatus comprising:
- a time-series signal clipping unit configured to perform, during normal operation of the facility, K times of clipping from two or more time-series signals indicating an operation state of the facility, where K is a positive integer;
- a normal vector registration unit configured to
  - set M types as types of two or more time-series signals clipped by the time-series signal clipping unit, where M is a positive integer,
  - construct an M-dimensional vector including M types of variables at a same time, and
  - register the constructed vector as a normal vector;
- an abnormality determination model registration unit configured to
  - set an abnormality determination flag as a first type when a maximum value of correlation between variables is less than a predetermined value,
  - set the abnormality determination flag as a second type when the maximum value of correlation between the variables is the predetermined value or more, and
  - perform, when the abnormality determination flag is of the second type, a principal component analysis on a registered normal vector group to calculate a transform coefficient of a principal component and register one or more calculated transform coefficients of principal components as an abnormality determination model;
- an abnormality determination unit configured to determine the abnormality of the facility;
- a time-series signal collection unit configured to collect a time-series signal indicating an operation state of the facility and a trigger candidate time-series signal that decides a condition for clipping the time-series signal indicating the operation state from a predetermined monitoring target section; and
- a trigger condition decision model generation unit configured to
  - specify beforehand a start time of the monitoring target section at which clipping regarding the time-series signal indicating the operation state of the facility is performed,
  - generate label data having ON for a label of the start time and OFF for other times, and
  - generate, by machine learning, a trigger condition decision model having each value of one or more of trigger candidate time-series signals at each of one or more times as an input and having the label data at each of the one or more times as an output,
- wherein the abnormality determination unit is configured to construct, at a time of abnormality determination of the facility, one M-dimensional vector from a time-series signal clipped similarly to a time during normal operation,
- when the abnormality determination flag is of the first type, the abnormality determination unit is configured to
  - calculate a distance between the M-dimensional vector as a target of abnormality determination and each of the registered normal vectors,
  - extract a predetermined number of one or more registered normal vectors as neighboring data in ascending order of a plurality of distances which includes the distance,
  - calculate a distance between a centroid vector of the neighboring data and the M-dimensional vector as a target of abnormality determination, and
  - perform abnormality determination on the facility based on the distance between the centroid vector of the neighboring data and the M-dimensional vector, and
- when the abnormality determination flag is of the second type, the abnormality determination unit is configured to
  - calculate a deviation from the principal component based on the transform coefficient of the principal component calculated in advance, and
  - perform abnormality determination on the facility based on the deviation,
- wherein the abnormality determination unit is configured to determine necessity of repair of the facility and cause the repair of the facility based on a frequency of determinations at which the facility has been determined to be abnormal in a predetermined period,
- wherein the time-series signal clipping unit is configured to clip the time-series signal based on the trigger condition decision model during the normal operation of the facility and at the time of abnormality determination on the facility, and
- wherein the facility is a facility of at least one of an iron making process, a manufacturing process for petroleum products or chemicals, and a research institution.

2. The abnormality determination apparatus according to claim 1, wherein the trigger condition decision model is a machine learning model including a decision tree.

3. The abnormality determination apparatus according to claim 1, wherein the facility comprises a hydraulic control device configured to control a position of a hydraulic cylinder by adjusting a valve opening degree of a servo valve.

4. The abnormality determination apparatus according to claim 3, wherein the two or more time-series signals include at least one of an excitation current of the servo valve and a position of the hydraulic cylinder device.

5. The abnormality determination apparatus according to claim 3, wherein the abnormality includes a first abnormality of a spool of the servo valve that worsens spool operation before occurrence of a second abnormality that causes an error in spool movement.

6. The abnormality determination apparatus according to claim 1, wherein the two or more time-series signals include at least one of a current and a speed of a motor of the facility.

7. An abnormality determination method of generating a model and determining an abnormality of a facility for performing a predetermined operation, the abnormality determination method comprising:

a time-series signal clipping step of performing during normal operation of the facility, K times of clipping from two or more time-series signals indicating an operation state of the facility, where K is a positive integer;

a normal vector registration step of setting types of two or more time-series signals clipped in the time-series signal clipping step as M types, constructing an M-dimensional vector including M types of variables at a same time, and registering the constructed vector as a normal vector, where M is a positive integer;

an abnormality determination model registration step of setting an abnormality determination flag to a first type in a case where a maximum value of correlation between variables is less than a predetermined value, setting the abnormality determination flag to a second type in a case where the maximum value of correlation between variables is the predetermined value or more, and in a case where the abnormality determination flag is of the second type, performing a principal component analysis on a registered normal vector group to calculate a transform coefficient of a principal component and registering one or more calculated transform coefficients of principal components as an abnormality determination model, a time-series signal collection step of collecting a time-series signal indicating an operation state of the facility and a trigger candidate time-series signal that decides a condition for clipping the time-series signal indicating the operation state from a predetermined monitoring target section;

a trigger condition decision model generation step of specifying beforehand a start time of the monitoring target section at which clipping regarding the time-series signal indicating the operation state of the facility is performed, generating label data having ON for a label of the start time and OFF for other times, and generating, by machine learning, a trigger condition decision model having each value of one or more of trigger candidate time-series signals at each of one or more times as an input and having the label data at each of the one or more times as an output, wherein the time-series signal clipping step clips the time-series signal based on the trigger condition decision model, a time-series signal clipping out step of clipping two or more time-series signals indicating an operation state of the facility; and an abnormality determination step of determining the abnormality of the facility;

wherein the abnormality determination step includes:

determining whether the abnormality determination flag of the two or more time-series signals clipped in the time-series signal clipping out step is of a first type or a second type, calculating, when the abnormality determination flag is of the first type, a distance from a registered normal vector, extracting a predetermined number of the one or more registered normal vectors as neighboring data in ascending order of a plurality of distances that include the distance, calculating a distance between a centroid vector of the neighboring data and the M-dimensional vector as a target of abnormality determination, and performing abnormality determination of the facility based on the distance between the centroid vector of the neighboring data and the M-dimensional vector, calculating, when the abnormality determination flag is of the second type, a deviation from a principal component based on a transform coefficient of the principal component, which has been calculated in advance, and performing abnormality determination of the facility based on the deviation, and determining necessity of repair of the facility and performing the repair of the facility based on a frequency of determinations at which the facility has been determined to be abnormal in a predetermined period, wherein the facility is a facility of at least one of an iron making process, a manufacturing process for petroleum products or chemicals, and a research institution.

8. An abnormality determination apparatus for determining an abnormality of a facility performing a predetermined operation, the abnormality determination apparatus comprising:

a time-series signal clipping unit configured to perform clipping of a time-series signal from two or more time-series signals of M types of variables indicating an operation state of the facility, where M is a positive integer; and an abnormality determination unit configured to, for the time-series signals clipped by the time-series signal clipping unit, set an abnormality determination flag as a first type when a maximum value of correlation between the variables is less than a predetermined value, set the abnormality determination flag as a second type when the maximum value of correlation between the variables is the predetermined value or more, and construct an M-dimensional vector including the M types of the variables at a same time, wherein when the abnormality determination flag is of the first type, the abnormality determination unit is configured to calculate a distance from a plurality of registered normal vectors clipped as time-series signals indicating the operation state of the facility during normal operation of the facility, extract a predetermined number of the normal vectors as neighboring data in ascending order of a plurality of distances which includes the distance, calculate a distance between a centroid vector of the neighboring data and the M-dimensional vector as a target of abnormality determination, and perform abnormality determination on the facility based on the distance between the centroid vector of the neighboring data and the M-dimensional vector, and wherein when the abnormality determination flag is of the second type, the abnormality determination unit is configured to calculate a deviation from a principal component based on a transform coefficient of a registered principal component calculated by performing a principal component analysis on a group of the registered normal vectors, and perform abnormality determination on the facility based on the deviation, wherein the time-series signal clipping unit is configured to clip the time-series signal based on a trigger condition decision model, and the trigger condition decision model has been generated by machine learning, for the time-series signal indicating the operation state of the facility, by specifying beforehand a start time of a monitoring target section at which clipping is performed, generating label data having ON for a label of the start time and OFF for other times, having each value of one or more of trigger candidate time-series signals at each of one or more times as an input, and having the label data at each of the one or more times as an output, wherein the abnormality determination unit is further configured to determine necessity of repair of the facility and cause the repair the facility based on a frequency of determinations at which the facility has been determined to be abnormal in a predetermined period, and wherein the facility is a facility of at least one of an iron making process, a manufacturing process for petroleum products or chemicals, and a research institution.

* * * * *